United States Patent
Cai et al.

(10) Patent No.: US 9,860,778 B2
(45) Date of Patent: Jan. 2, 2018

(54) METHOD AND SYSTEM FOR OPTIMIZATION OF MEASUREMENT REPORTING IN WIRELESS NETWORKS

(71) Applicant: Huawei Technologies Sweden AB, Kista (SE)

(72) Inventors: Tao Cai, Kista (SE); Jaap Van De Beek, Kista (SE)

(73) Assignee: Huawei Technologies Sweden AB, Kista (SE)

(*) Notice: Subject to any disclaimer, the term of this patent is extended or adjusted under 35 U.S.C. 154(b) by 39 days.

(21) Appl. No.: 14/200,591

(22) Filed: Mar. 7, 2014

(65) Prior Publication Data

US 2014/0187235 A1     Jul. 3, 2014

Related U.S. Application Data

(63) Continuation of application No. PCT/EP2011/065689, filed on Sep. 9, 2011.

(51) Int. Cl.
*H04W 24/10* (2009.01)
*H04W 48/18* (2009.01)

(52) U.S. Cl.
CPC ............ *H04W 24/10* (2013.01); *H04W 48/18* (2013.01)

(58) Field of Classification Search
CPC ...... H04W 24/10; H04W 28/18; H04W 48/18
See application file for complete search history.

(56) References Cited

U.S. PATENT DOCUMENTS

| | | | |
|---|---|---|---|
| 2010/0240407 A1* | 9/2010 | Park | H04W 72/00 455/512 |
| 2011/0096688 A1* | 4/2011 | Sachs | H04W 48/18 370/252 |
| 2011/0199923 A1* | 8/2011 | Persson | H04W 24/10 370/252 |

(Continued)

FOREIGN PATENT DOCUMENTS

| | | |
|---|---|---|
| CN | 101998490 A | 3/2011 |
| CN | 102007801 A | 4/2011 |

(Continued)

OTHER PUBLICATIONS

"Triggering of Reporting of MDT Measurements," 3GPP TSG RAN WG2 Meeting #68-bis, Valencia, Spain, R2-100261, 3rd Generation Partnership Project, Valbonne, France (Jan. 18-22, 2010).

(Continued)

*Primary Examiner* — Lester Kincaid
*Assistant Examiner* — William Wang
(74) *Attorney, Agent, or Firm* — Leydig, Voit & Mayer, Ltd.

(57) ABSTRACT

A controller of a layered radio environment map of a wireless communication system. The controller configures a mobile terminal to make a measurement associated with a wireless signal from the mobile terminal to a base station. The mobile terminal constructs a minimization of drive test (MDT) measurement report from the measurement, and uses a network connection to transmit the MDT measurement report. The network connection is selected based at least in part on information related to the mobile terminal. As such, the power consumption in the mobile terminal is minimized.

16 Claims, 4 Drawing Sheets

(56) References Cited

U.S. PATENT DOCUMENTS

| | | | | |
|---|---|---|---|---|
| 2011/0201279 A1* | 8/2011 | Suzuki | .................. | H04W 24/10 |
| | | | | 455/67.11 |
| 2012/0015657 A1* | 1/2012 | Comsa | .............. | H04W 36/0094 |
| | | | | 455/436 |
| 2012/0088457 A1* | 4/2012 | Johansson | ............. | H04W 24/10 |
| | | | | 455/67.11 |

FOREIGN PATENT DOCUMENTS

| | | |
|---|---|---|
| EP | 2437540 A1 | 4/2012 |
| WO | 2005039215 A1 | 4/2005 |
| WO | WO 2009127276 A1 | 10/2009 |
| WO | WO 2010145531 A1 | 12/2010 |

OTHER PUBLICATIONS

"3$^{rd}$ Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10)," 3GPP TS 37.320, Version 10.2.0, 3$^{rd}$ Generation Partnership Project, Valbonne, France (Jun. 2011).

* cited by examiner

METHOD AND SYSTEM FOR OPTIMIZATION OF MEASUREMENT REPORTING IN WIRELESS NETWORKS

CROSS-REFERENCE TO RELATED APPLICATIONS

This application is a continuation of International Patent Application No. PCT/EP2011/065689, filed on Sep. 9, 2011, which is hereby incorporated by reference in its entirety.

TECHNICAL FIELD

The aspects of the present disclosure relate generally to wireless communication networks and in particular to measurement, reporting and optimization of wireless networks.

BACKGROUND

Drive tests are the major method used by cellular network operators to collect performance metrics for the purpose of network deployment and operation. Drive testing is where a vehicle, equipped to record measurements and location information, is driven around the test area to record data that is then used offline to analyze network coverage in different locations. The network operator will then use this analysis to adjust and optimize network parameters, such as antenna power, locations, antenna tilts, etc. After changes are made, drive testing is undertaken again to ensure the desired improvements were achieved. Drive tests are done periodically to verify network coverage and may be triggered by customer complaints or they may also be used to identify coverage problems after significant environmental changes occur such as for instance, when a large building is constructed. Unfortunately, drive tests are costly and adversely impact the environment. It is therefore desirable to develop automated solutions (e.g., assisted by user equipment) to reduce the amount of drive testing that needs to done. Efforts to reduce the need for drive testing are collectively referred to as Minimization of Drive Test or MDT.

SUMMARY

As described herein, the exemplary embodiments overcome one or more of the above or other disadvantages known in the art.

One aspect of the exemplary embodiments relates to a method in a wireless communication system for gathering measurements associated with wireless signals from a mobile terminal to a base station. In one embodiment, the method is performed by a centralized radio environment map controller and includes: configuring one or more mobile terminals to make measurements of the radio environment; configuring the one or more mobile terminals to construct a minimization of drive test report from the measurements; obtaining information related to the one or more mobile terminals; directing the one or more mobile terminals to transmit the report; directing each of the one or more mobile terminals to use a particular network connection to transmit the report; and storing the report in a layered radio environment map. The particular network connection is selected based in part on the information related to the one or more mobile terminals such that power consumption in each of the one or more mobile terminals is minimized.

Another aspect of the exemplary embodiments relates to a mobile communications network management system. In one embodiment, the system includes one or more mobile terminals each with a processor and storage; one or more base stations each with a processor and storage and in wireless communication with the one or more mobile terminals; a radio environment map comprising a centralized database; and a radio environment map manager in communication with the one or more base stations and the one or more mobile terminals. The radio environment map manager is programmed to configure the one or more mobile terminals to make measurements of the radio environment; configure the one or more mobile terminals to construct a minimization of drive test report from the measurements; obtain information related to the one or more mobile terminals; direct each of the one or more mobile terminals to transmit the report; direct each of the one or more mobile terminals to use a particular network connection to transmit the report; and store the report in the radio environment map, wherein the particular network connection is selected based in part on the information related to the one or more mobile terminals such that power consumption in each of the one or more mobile terminals is minimized.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the disclosure, for which reference should be made to the appended claims. Additional aspects and advantages of the disclosure will be set forth in the description that follows, and in part will be apparent from the description, or may be learned by practice of the disclosure. Moreover, the aspects and advantages of the disclosure may be realized and obtained by the instrumentalities and combinations particularly pointed out in the appended claims.

DETAILED DESCRIPTION

Figure 1:
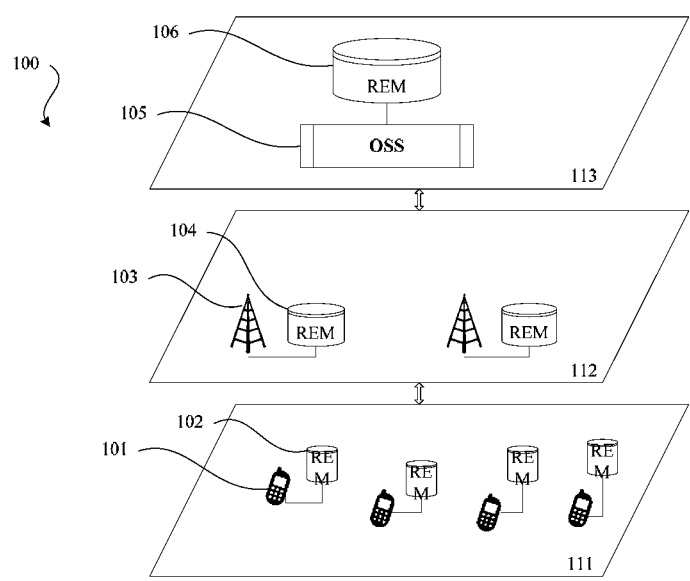
FIG. 1 illustrates a general cellular network with a layered radio environment map incorporating aspects of the disclosed embodiments.

The main method used to minimize drive testing, is to enable user equipments (UE), such as cellphones or other types of mobile terminals, to carry out various radio network measurements. The data recorded by each mobile terminal can include cell identity information such as the Physical Cell Identifier (PCI), and cell Global Identifier (CGI), as well as received power and quality information such as Reference Signal Received Power (RSRP) and Reference Signal Received Quality (RSRQ). The software application layer in the mobile terminal may also gather higher level data such as Perceptual Evaluation of Speech Quality (PESQ) for voice services and the throughput for File Transfer Protocol (FTP) traffic. All these types of information are tagged with available location information, as well as stamped with time information. They are then aggregated into a Minimization of Drive Test (MDT) measurement report. There are two types of MDT functionality. When a mobile terminal is connected, the mobile terminal can make measurements and report the measurements back to a Base Station (BS) or other controller that may be available during the connection. This is known as immediate MDT. While a mobile terminal is idle, the mobile terminal can log MDT measurements locally and report the measurements at a later time. This is called logged MDT.

A Radio Environment Map (REM) is a knowledge base containing information about all aspects of the radio environment in which a cellular system operates. The REM allows cognitive wireless devices to look through a wide range of knowledge to make optimal adaptations. Because the radio environment is continuously changing, information stored in the REM is dynamic and is continuously being updated. This information is then used either by a resource manager to maintain and optimize the whole system directly or as input to modeling processes that generate more efficient representation of collected data such as statistical behavior descriptions. Statistical representation reduces how often information used by Radio Resource Management (RRM) techniques needs to be updated, thereby reducing signaling overhead, and also facilitates development and implementation of context-aware RRM techniques that enhance network performance.

In contrast to existing static databases for wireless networks, REMs, through the use of the UE based MDT measurements described above as well as other data gathering techniques, can provide wireless networks with a comprehensive and up-to-date representation of the radio environment. This reduces the operating expenses (OPEX) of a network provider by reducing the need for drive tests and measurement campaigns, hence contributing to the attractiveness of REMs.

When gathering MDT measurements in wireless networks, User Equipment (UE), can be used to make measurements and report them back to the network. Often, the UE is requested to measure and report on multiple base stations (BS) at a time. Those measurements can be stored in a database such that the measurements can be accessed and used by network management entities. Each node in the network such as User Equipment, Base Station, Mobile Switching Centre (MSC), Operations Storage System (OSS), etc., contains a certain amount of storage that can be used to distribute the REM among various nodes in the system. Distribution of the REM information leads to the need for a way to optimize distribution of information and use of storage capacity at the various network nodes. State of the art storage functionality such as that performed by a Relational Database Management System (RDBMS) with mirroring, failover, logging, etc., is typically done only in a dedicated network operation and maintenance system such as an Operations Storage System (OSS). However, centralizing the REM reduces a systems ability to take advantage of various environmental factors, such as storage capacity, or to perform optimizations based on the purpose of a measurement.

MDT measurement reports can contain large amounts of data resulting in difficulties when moving them throughout a network. Transmission of these reports from a mobile terminal to a base station and/or from a base station to the OSS can consume significant amount of uplink transmission bandwidth. Transmission of the Measurement Reports, from a mobile terminal to a base station, is typically scheduled by the base station, and if not scheduled properly, the transmission can cause uplink signaling congestion. Power consumption caused by transmission of Measurement Reports, can adversely affect battery life of the User Equipment resulting in customer satisfaction problems.

Accordingly, it would be desirable to provide a method and system that addresses at least some of the problems identified above.

In describing aspects of the disclosed embodiments reference is made to the drawings where there is seen in FIG. 1 a depiction of a general cellular network with a layered Radio Environment Map (REM) 100. Each mobile terminal 101 represents a piece of user equipment such as a mobile phone, smart phone, tablet PC, etc., containing a processor and storage. The term storage is used to describe any type of computer memory that is accessible by the processor. The processor and storage in the mobile terminal 101 is available to host portions of the REM 102. There can be many mobile terminals 101 participating in the cellular network 100 at any time. The increasing use of smartphones and tablet PC's provide the ability for service providers to embed MDT measurement and reporting functionality directly in each mobile terminal 101 so that gathering and reporting of MDT reports can be carried out by each mobile terminal 101. New standards being developed by industry groups such as the $3^{rd}$ Generation Partnership Project (3GPP) are including specifications to support MDT measurement, data gathering, and reporting.

In some embodiments, the Radio Environment Map (REM) is structured as a Layered REM where portions with portions deployed in various system layers, such as the control layer 113, base station layer 112, and mobile layer 111 shown in FIG. 1. In the embodiment shown in FIG. 1, the Mobile Terminal REM 102 is hosted by a processor and storage in the mobile terminals 101, Base Station REM 104 is hosted by a processor and storage in a base station 103, and central REM 106 is hosted by a processor and storage in the Operations Storage System (OSS) 105. In the embodiments described herein, the REM 106 is a knowledge base comprised of storage and a processor that have data, programmed instructions, and rules that provide intelligent access to information contained in the REM. The REM 106 does not always have its own processor and storage. In situations where resources are limited and there is available storage and processing capabilities available in the hosting device, such as for example a mobile terminal, the REM 106 shares the processor and storage of the hosting device.

The mobile terminals 101 communicate with base stations (BS) 103 via wireless signaling. The Base Station 103 is the section of a cellular telephone network that is responsible for handling traffic and signaling between a mobile terminal 101 or mobile phone 101 and the network switching subsystem. A base station 103 contains equipment for transmitting and receiving radio signals, encryption/decryption of signals and communication with other nodes in the system, such as a Base Station Controller (not shown). The base stations 103 can be of any type, such as, for example, a Base Transceiver Station (BTS) or an eNodeB (eNB) type base station. A BTS is used in both the Global System for Mobile Communications (GSM) (originally called "Groupe Spécial Mobile") and Code Division Multiple Access (CDMA) systems, while an eNodeB (eNB) type base station is used in the Universal Telecommunications System (UMTS) or a femtocell, such as a Home eNodeB (HeNB), etc. There can be multiple base stations 103 in contact with each mobile terminal 101 at any point in time. Each base station 103, which may also be referred to as an access point, contains processing capability and storage that is used in some embodiments to host portions of the REM 104. The mobile terminals 101 transfer MDT measurement reports to the base stations 103 using either "Immediate MDT," in which reports are transferred while mobile terminal 101 is connected, or through "Logged MDT," in which reports are transferred during mobile terminal 101 idle time. In another aspect of the present disclosure, the base station 103 is equipped to make MDT measurements and collect other necessary data then store the measurements in local REM 104. Each base station 103 transfers the data stored in its local REM 104 to the Operations Storage System (OSS) 105 for inclusion in the central REM 106. Once data is transferred to the central REM 106, the data may be removed from the local REM 102 and 104, if desired. In some aspects of the present disclosure, copies of MDT reports are retained in local REM 102, 104, as will be discussed in further detail below. When the REM is distributed throughout storage located in the various system layers, such as the control layer 113, base station layer 112, and mobile layer 111 depicted in FIG. 1, the REM is referred to as a Layered REM. Distribution and management of the Layered REM is done by a central REM Manager, as will be discussed in more detail below.

Within the layered REM architecture 100, measurements are carried out by a mobile terminal 101 or by a base station 103 and are initially buffered locally. However, the storage capacity available for measurements in mobile terminals 101 is limited. Current standards that are being created by the 3GPP specify that the MDT features have a minimum buffer size requirement of 64 kB (kilobytes). A mobile terminal vender will likely provide storage capacity that is just above this minimum value; whereas, typical MDT logging storage requirements can often consume several megabytes. In addition, measurements made by the software application layer of the mobile terminal are added into the MDT report, which increases its size further. Such memory use might become a burden for the mobile terminal 101, which can adversely affect customer satisfaction. However, the impact on mobile terminal 101 memory can be mitigated by lowering the frequency at which data is logged and increasing the frequency at which reporting is done. To take full advantage of these mitigation strategies, they need to be done in a coordinated way, taking into account other aspects, such as required MDT performance and the amount of mobile terminal power consumption used during reporting.

Layered REM contains knowledge of mobile terminal capabilities such as localization capabilities and mobile terminal measurement locations. Some mobile terminals provide high localization capability, i.e., they can provide highly accurate position information, through the use of the United States' Global Positioning System (GPS) or with another Global Navigation Satellite System (GNSS), while other mobile terminals have only low localization capabilities that derive location information from data contained within the communication network itself, for example by triangulating nearby base stations. Under the coordination of layered REM, MDT can be done with combined measurements from both low localization capability mobile terminals and high localization capability mobile terminals. This coordination saves energy consumption of the GPS/GNSS enabled mobile terminals while also maintaining accuracy of the REM.

Figure 2:
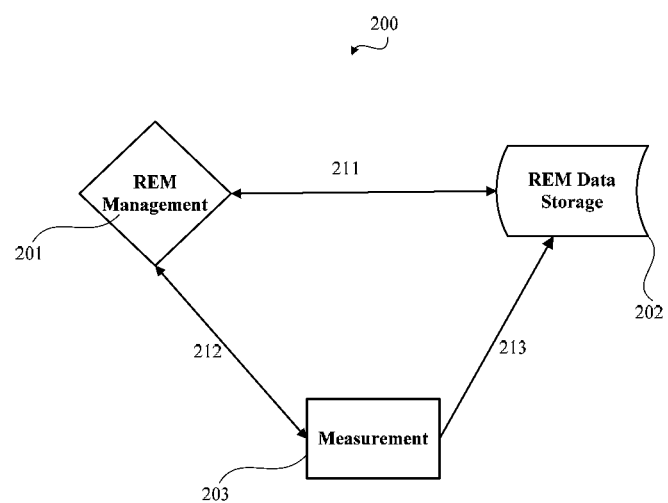
FIG. 2 illustrates a functional view of a REM control system architecture incorporating aspects of the disclosed embodiments.

FIG. 2 depicts a functional view of a REM control system architecture 200 incorporating aspects of the present disclosure which includes REM Management 201, REM Data Storage 202, and Measurement 203. FIG. 2 depicts functions that may be included in the architecture and is not intended to constrain how the various functions are deployed throughout a system 100 in FIG. 1. For example, REM Data Storage 202 may be deployed as a layered REM where REM Data Storage 202 is distributed between various layers in the system such as for example the central control layer 113, base station layer 112, and a mobile layer 111 as is shown in FIG. 1. The Measurement 203 functionality is where actual measurements are taken and data is gathered to construct reports, such as, for example, MDT reports. Measurement is performed by the mobile terminals 101 and by the base stations 103 and may include a variety of values, such as, for example, Physical Cell Identifier (PCI), Cell Global Identifier (CGI), received power and quality information such as Reference Signal Received Power (RSRP), and Reference Signal Received Quality (RSRQ), as well as higher level data such as Perceptual Evaluation of Speech Quality (PESQ) for voice services and the throughput for File Transfer Protocol (FTP) traffic. Once measurements have been taken and the reports are constructed, the data is saved by REM Data Storage 202. Reports, such as MDT reports are constructed and stored in local REM 102, 104 in both the mobile terminals 101 and the base stations 103. The REM Management function 201 controls overall operation of the REM including control of storage and data transfers. A software application that performs REM Management functions will be referred to as a REM Manager and can be deployed in multiple locations within the network. In aspects of the present disclosure, REM Management 201 is performed by an application deployed in a central location such as where the OSS 105 is located. In alternate embodiments, REM Management 201 can be deployed elsewhere, such as for example at a mobile switching station or another network accessible data center, where it can perform its central management function equally well. In still other embodiments, REM Management 201 is structured in a layered architecture where portions of REM management 201 are distributed in multiple network nodes including mobile terminals 101 and base stations 104 along with REM Data Storage 202 as described above. When REM Management is distributed, the various portions remain in communication with each other so a centralized nature of the control is maintained. REM Management 201 provides control for and obtains data from the REM Data Storage 202 as depicted by signal path 211. REM management 201 also controls and obtains information from the Measurement function 203 as shown in signal path 212. Measurement data is then sent to the desired REM Data Storage 202 location by the Measurement function 203 as directed by REM Management 201. REM Management 201 tells the Measurement function 203 when and how, to send its information to REM Data Storage 202. When instructing the Measurement function 203 on how to send information, information about which network to use is included in cases where there are multiple network connections available.

In one embodiment of the present disclosure, the layered REM architecture 100 is structured such that the mobile terminal 101 memory can be managed as the lowest level of REM Data Storage 202. A REM manager 201 embedded in the OSS 105 is used to coordinate all aspects of the layered REM. REM manager 201 contains intelligent programming that allows efficient distribution of MDT data storage at different hierarchical levels of the system architecture 100. Optimization can be done dynamically to balance the use of storage capacity available at different network nodes such as base stations 103 or mobile terminals 101. The REM manager 201 can choose when to retrieve MDT measurement reports from mobile terminals 101 based on criteria such as evaluation of mobile terminal 101 memory usage, network traffic in the system, as well as energy consumption required for reporting. The layered REM architecture 100 is suitable to support the MDT function under such constrains and, moreover, it helps to optimize MDT functionalities through awareness of network context and coordination in heterogeneous Long Term Evolution (LTE) systems.

Figure 3:
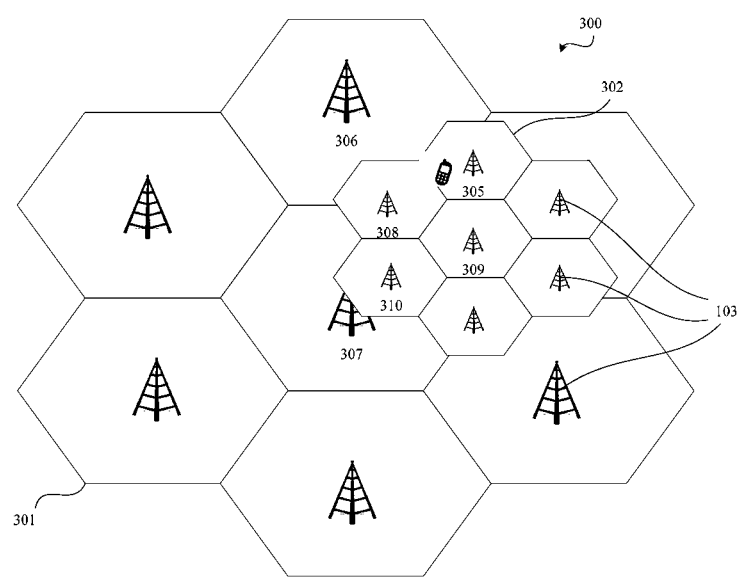
FIG. 3 illustrates an arrangement of Base Stations within cells as may be seen in a cellular network, according to one embodiment of the disclosure.

FIG. 3 illustrates an arrangement of base stations 103 as may be seen in a cellular network 300. Each base station 103 services a cell depicted by hexagons, or macrocells 301. A cellular network can contain an arbitrary arrangement of macrocells 301, and femtocells 302 that may have overlapping service areas. At any given time, the mobile terminal 101 may be able to connect to more than one base station 103 and can record measurements from a larger number of base stations 103. For example, the macrocells 310 may be served by macro eNodeB (eNB) base stations, while the femtocells 302 may be served by Home eNodeB (HeNB) base stations. When transferring data, such as for example a MDT report, the mobile terminal 101 connects to and establishes an uplink with a base station 103. In an example of cellular network 300, the mobile terminal 101 may be able to connect to and establish an uplink with several of the base stations, such as base stations 305, 306, 307 and 308. Transfer of data over each of these connections may require different amounts of power from the mobile terminal. For example the power a mobile terminal uses to send data over an uplink to an eNodeB macrocell can be significantly greater than the power required when using a HeNB femtocell. The central REM Manager can take advantage of this to reduce mobile terminal power consumption by instructing the mobile terminal to use an uplink to a HeNB base station when possible. REM Management 201 is configured to consider this type of network context information in its optimization algorithms so it can minimize the amount of power consumed by transfer of the MDT reports and ensure power consumed by a mobile terminal remains below acceptable limits. The above discussion can readily be applied to more general cellular networks containing complex mixtures of macrocells, microcells, picocells as well as femtocells, etc. with many different types of base stations.

In practice, a network operator needs to ensure their customers that logging of the MDT measurements and reporting consumes minimum mobile terminal 101 energy and uses only limited mobile terminal 101 data storage capacity. As was discussed above, mobile terminals 101 often have the option of connecting to any of several base stations 103, which may be of different types, such as, for example, eNB or HeNB. In this scenario, REM management 201 has the ability to decide which base station 103 receives the MDT data from the mobile terminal 101. By utilizing network context aware coordination algorithms provided by the centralized REM management 201, the mobile terminal 101 can send the logged MDT report via a HeNB instead of an eNB, even if the MDT measurements are done in macrocells. This results in reduced uplink transmission power, which leads to mobile terminal energy saving and extension of mobile terminal battery life.

In one embodiment, the mobile terminal 101 can send battery status to the REM Manager 201 so that the REM Manager 201 can take into account the battery status (or available charge or power) for the uplink transmission. Logged or stored MDT measurement reports can remain in the mobile terminal 101 for a pre-determined period of time, which under current 3GPP standards is defined as a 48-hour period. The REM Manager 201 can arrange for the mobile terminal 101 to hold the uplink transmission if the battery status is lower than a pre-determined threshold, or the needed uplink transmission energy is higher than a pre-determined threshold value. The needed uplink transmission energy can vary according to the distance from the mobile terminal 101 to an uplink receiver (i.e., a base station 103).

During the period of time that MDT measurement reports can remain in the terminal 101, it is likely that the battery in the mobile terminal 101 is recharged or that the mobile terminal 101 is moved closer to an uplink, such that the needed uplink transmission is lower than the predetermined threshold value. If the mobile terminal 101 cannot be granted uplink transmission permission for the MDT measurement report within the pre-determined time period (such as 48-hours), then the stored measurement report is discarded by the mobile terminal 101.

Figure 4:
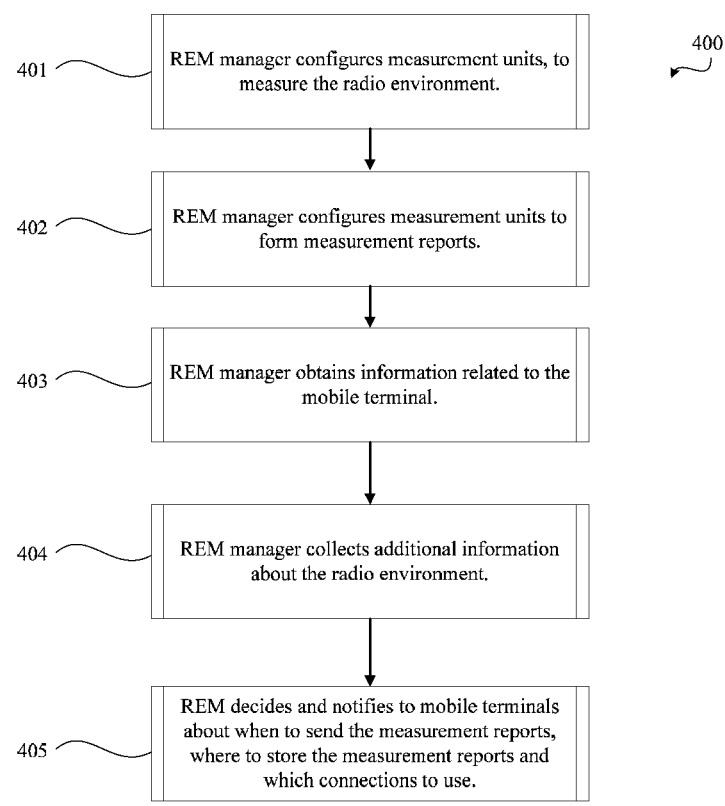
FIG. 4 illustrates a flow chart of a method for managing measurement and reporting in a wireless communication system incorporating aspects of the present disclosure.

A method 400 is illustrated in the flowchart of FIG. 4, where the collection of reports is enhanced through the use of a centralized REM Manager hosted by, for example, a processor and storage in the control layer 113, according to one embodiment. At step 401, the REM manager 201 configures measurement units, such as, for example, mobile terminals 101, base stations 103, and/or other network nodes, to make measurements of the radio environment. The measurement units are then instructed, at step 402, to use these measurements to construct reports such as for example MDT reports. At step 403, the REM manager 201 obtains information related to the mobile terminals 101 and the base stations 103. The information gathered can include items such as the serving cell type, mobile terminal power status, storage capacity, available networks, network traffic levels, mobile terminal location, etc. Some of the collected information is gathered specifically for the REM Manager 201, while other information may be drawn from data already included in communication signaling between the mobile terminals 101 and the base stations 103. Next, at step 404, the REM manager 201 collects additional information about other items in the environment, including items such as the storage capacity of different network nodes, the purpose for the measurement reports, the traffic status of access networks, the traffic status of backhaul link, and/or core network traffic status. The gathered information is then used by the REM Manager 201, at step 405, to make a number of decisions about how the reports should be handled including item such as for example where the measurement reports should be sent, where the measurement reports should be stored, when the reports should be sent, and what network connections to use.

One exemplary embodiment of optimization logic contained in the REM Manager programming handles rush hour scenarios when there is high traffic demand and network uplink signaling is operating at or near capacity. When network traffic is high, logged MDT data is stored at the local REM level 102 of the mobile terminal 101 (referred to herein as mobile terminal REM 102) for optimized periods. The logged MDT data is then reported back at a later time when network traffic is low. REM Management 201 uses information gathered at step 404 to determine which network to use and to schedule transmission of the MDT reports from the mobile terminal REM 102 and the REM 104 of the base station 103 (referred to herein as base station REM 104) in a manner that will alleviate possible uplink signaling congestions.

Another exemplary embodiment of logic contained in REM manager programming helps optimize data storage by deciding where to store MDT measurements depending on how these measurements are to be used. For example, MDT data related to local coverage holes or dead spots, (e.g., coverage holes within one cell) can be stored in base station REM 104, such as, for example, in an eNB or HeNB Gateway. The locally stored REM information is then used in localized optimization algorithms that are relatively fast compared with performing optimization algorithms at other nodes in the system and transmitting the results back to the local base station 103. These algorithms are performed by RRM modules connected to a local REM manager. MDT data concerning larger area coverage problems, i.e., problems that involve more than one cell or base station, and/or problems related to handover of mobile terminals from one cell to another, are stored in a higher level REM, such as for example at the OSS level 113. The centralized REM storage allows other optimization algorithms to be performed that are guided by a higher level REM manager and are based on larger samplings of MDT measurement data.

The REM architecture and system 100 is configured to utilize program storage devices embodying machine-readable program source code that is adapted to cause the apparatus to perform and execute the method steps and processes disclosed herein. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media, such as a diskette, disk, memory stick or computer hard drive, which is readable and executable by a computer. In other alternate embodiments, the program storage devices could include optical disks, read-only-memory ("ROM") floppy disks and semiconductor materials and chips.

The system 100 may also include one or more processors for executing stored programs, and each may include a data storage or memory device on its program storage device for the storage of information and data. The computer program or software incorporating the processes and method steps incorporating aspects of the disclosed embodiments may be stored in one or more computer systems or on an otherwise conventional program storage device.

Thus, while there have been shown, described and pointed out, fundamental novel features of the disclosure as applied to the exemplary embodiments thereof, it will be understood that various omissions and substitutions and changes in the form and details of devices and methods illustrated, and in their operation, may be made by those skilled in the art without departing from the spirit and scope of the disclosure. Moreover, it is expressly intended that all combinations of those elements and/or method steps, which perform substantially the same function in substantially the same way to achieve the same results, are within the scope of the disclosure. Moreover, it should be recognized that structures and/or elements and/or method steps shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. A method in a wireless communication system for gathering a measurement associated with a wireless signal from a mobile terminal to a base station, the method comprising:
    configuring, by a controller of a layered radio environment map (REM) of the wireless communication system, the mobile terminal to make a measurement associated with the wireless signal from the mobile terminal to the base station, wherein the layered REM comprises a control layer, a base station layer, and a mobile layer;
    configuring, by the controller, the mobile terminal to construct a minimization of drive test (MDT) measurement report from the measurement;
    obtaining, by the controller, information related to the mobile terminal;
    directing, by the controller, the mobile terminal to use a network connection to transmit the MDT measurement report; and
    storing, by the controller, the MDT measurement report in a REM data storage at one layer of the layered REM, wherein the REM data storage is distributed between the control layer, the base station layer, and the mobile layer of the layered REM, wherein the network connection is selected based at least in part on the information related to the mobile terminal, wherein a portion of the layered REM deployed in the control layer comprises a processor and storage, wherein the MDT measurement report is stored in the storage of the control layer when the MDT measurement report comprises MDT data related to a coverage hole involving more than one base station, and wherein once the MDT data is stored in the storage of the control layer, the MDT data is removed from a storage of the base station layer and removed from a storage of the mobile layer.

2. The method of claim 1, wherein the information related to the mobile terminal includes at least one of: location of the mobile terminal, battery power of the mobile terminal, signal strength of an available wireless connection of the mobile terminal, a type of an available wireless connection of the mobile terminal, and a traffic level of an available wireless connection of the mobile terminal.

3. The method of claim 1, wherein the MDT measurement report is transmitted under a schedule set by the controller such that uplink signaling congestion is avoided.

4. The method of claim 1, wherein the measurement made by the mobile terminal is coordinated based on localization capabilities of the mobile terminal.

5. The method of claim 1, wherein the measurement associated with the wireless signal includes at least one of: Physical Cell Identifier, Cell Global Identifier, Reference Signal Received Power, Reference Signal Received Quality, Perceptual Evaluation of Speech Quality, and throughput for File Transfer Protocol traffic.

6. The method of claim 1, wherein the MDT measurement report is selectively stored based on a purpose of the MDT measurement report.

7. The method of claim 1, wherein the configuring the mobile terminal to construct the MDT measurement report comprises at least one or any combination of the following:
    configuring the mobile terminal to store the MDT measurement report at the mobile terminal for a first period of time;
    configuring the mobile terminal to hold the MDT measurement report if battery power of the mobile terminal is below a power threshold, or a needed uplink transmission energy is above an energy threshold;
    configuring the mobile terminal to transmit the MDT measurement report if battery power of the mobile terminal moves above a power threshold from below the power threshold, or the needed uplink transmission energy moves below an energy threshold from above the energy threshold; and
    configuring the mobile terminal to discard the MDT measurement report if the MDT measurement report has not been transmitted within a second period of time.

8. The method of claim 1, wherein the network connection for transmitting the MDT measurement report is between the mobile terminal and a home eNodeB base station if the measurement is associated with the wireless signal being sent from the mobile terminal to a macro eNodeB base station.

9. A controller of a layered radio environment map (REM), comprising:
at least one processor configured to:
instruct a mobile terminal to perform a measurement associated with a wireless signal from the mobile terminal to a base station in a wireless communication system, wherein the layered REM comprises a control layer, a base station layer, and a mobile layer;
instruct the mobile terminal to construct a minimization of drive test (MDT) measurement report from the measurement;
obtain information related to the mobile terminal;
instruct the mobile terminal to use a network connection to transmit the MDT measurement report; and
store the MDT measurement report in a REM data storage at one layer of the layered REM, wherein the REM data storage is distributed between the control layer, the base station layer, and the mobile layer of the layered REM, wherein the network connection is selected based at least in part on the information related to the mobile terminal, wherein a portion of the layered REM deployed in the control layer comprises a processor and storage, wherein the MDT measurement report is stored in the storage of the control layer when the MDT measurement report comprises MDT data related to a coverage hole involving more than one base station, and wherein once the MDT data is stored in the storage of the control layer, the MDT data is removed from a storage of the base station layer and removed from a storage of the mobile layer.

10. The controller of claim 9, wherein the information related to the mobile terminal includes at least one of: location of the mobile terminal, battery power of the mobile terminal, signal strength of an available wireless connection of the mobile terminal, a type of an available wireless connection of the mobile terminal, and a traffic level of an available wireless connection of the mobile terminal.

11. The controller of claim 9, wherein the MDT measurement report is transmitted under a schedule set by the controller such that uplink signaling congestion is avoided.

12. The controller of claim 9, wherein instructing the mobile terminal to construct the MDT measurement report comprises: instructing the mobile terminal to hold the MDT measurement report if battery power of the mobile terminal is below a power threshold or a needed uplink transmission energy is above an energy threshold.

13. The controller of claim 9, wherein instructing the mobile terminal to construct the MDT measurement report comprises: instructing the mobile terminal to transmit the MDT measurement report if battery power of the mobile terminal moves above a power threshold from below the power threshold or the needed uplink transmission energy moves below an energy threshold from above the energy threshold.

14. The controller of claim 9, wherein instructing the mobile terminal to construct the MDT measurement report comprises: instructing the mobile terminal to discard the MDT measurement report if the MDT measurement report has not been transmitted within a predetermined period of time.

15. The controller of claim 9, wherein the network connection for transmitting the MDT measurement report is between the mobile terminal and a home eNodeB base station if the measurement is associated with the wireless signal being sent from the mobile terminal to a macro eNodeB base station.

16. A mobile communications network management system, comprising:
a mobile terminal comprising a processor and storage;
a base station comprising a processor and storage, wherein the base station is in wireless communication with the mobile terminal;
a layered radio environment map (REM) comprising a centralized database, wherein the layered REM comprises a control layer, a base station layer, and a mobile layer; and
a REM manager in communication with the base station and the mobile terminal, wherein the REM manager is configured to:
direct the mobile terminal to perform a measurement associated with wireless communication between the mobile terminal and the base station,
direct the mobile terminal to construct a minimization of drive test (MDT) report from the measurement,
obtain information related to the mobile terminal,
direct the mobile terminal to use a network connection to transmit the MDT report, and
store the MDT measurement report in a REM data storage at one layer of the layered REM, wherein the REM data storage is distributed between the control layer, the base station layer, and the mobile layer of the layered REM, wherein the network connection is selected based at least in part on the information related to the mobile terminal, wherein a portion of the layered REM deployed in the control layer comprises a processor and storage, wherein the MDT measurement report is stored in the storage of the control layer when the MDT measurement report comprises MDT data related to a coverage hole involving more than one base station, and wherein once the MDT data is stored in the storage of the control layer, the MDT data is removed from a storage of the base station layer and removed from a storage of the mobile layer.

* * * * *